May 30, 1939.   R. A. HAGEN   2,160,654
PISTON RING
Original Filed Sept. 6, 1932
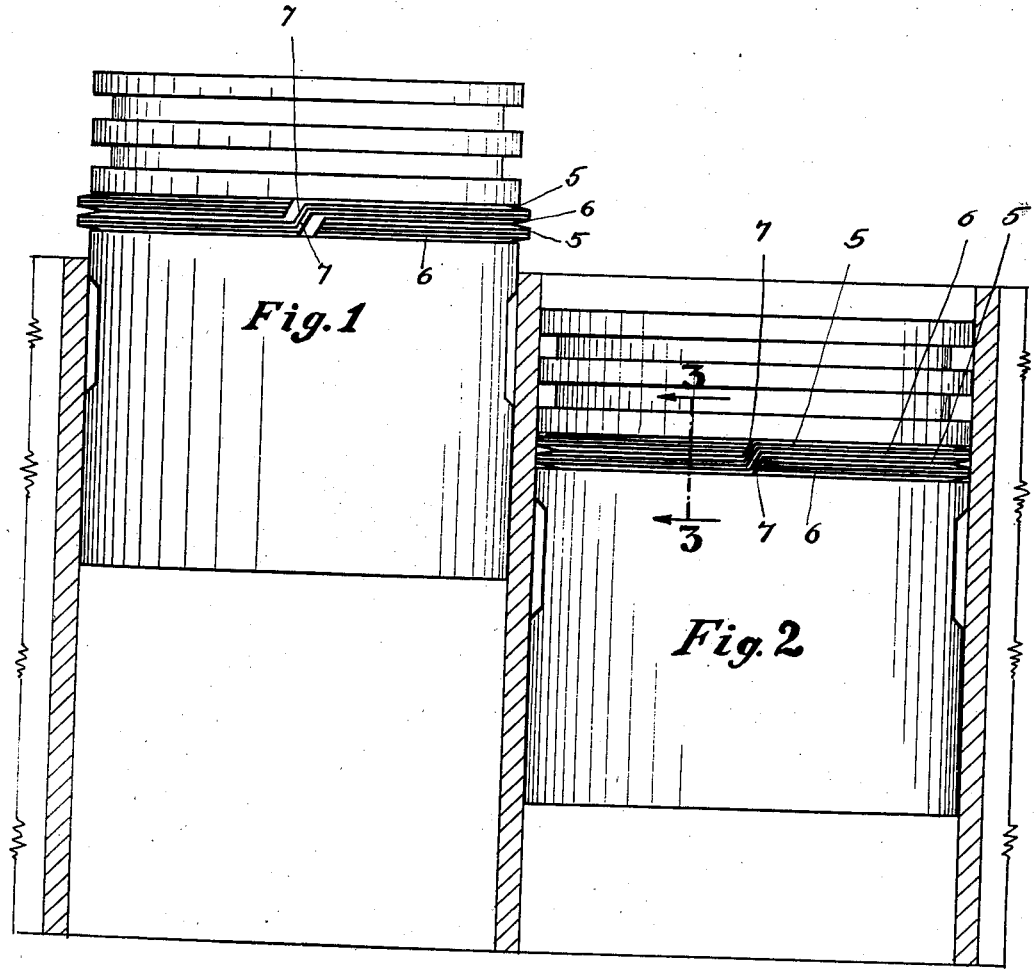
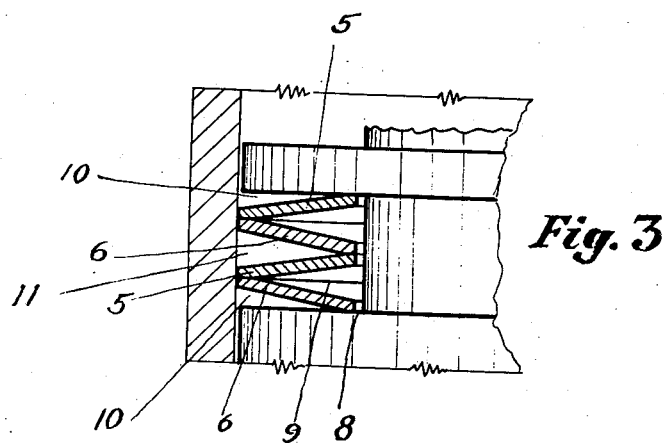
INVENTOR.

Patented May 30, 1939

2,160,654

UNITED STATES PATENT OFFICE 2,160,654

PISTON RING

Rudolf A. Hagen, Grand Island, Nebr., assignor, by direct and mesne assignments, of one-half to Claude J. Doran, St. Louis, Mo., and one-half to Coil Piston Ring Company of America, St. Louis, Mo., a corporation of Missouri Application September 6, 1932, Serial No. 631,743
Renewed January 9, 1939

14 Claims. (Cl. 309—24)

The invention relates to piston rings, and more especially to that type of piston rings, which consist of a plurality of cooperating members.

The object of the invention is to provide a piston ring, which is composed of two spirally wound members, made of flat spring material, and each member having approximately two spiral circuits.

Another object of the invention is to provide a piston ring consisting of two spirally wound members shaped so that the upper and lower surfaces of the ring are each located in such a manner that they form a continuous conically shaped surface, when the piston ring is arranged in the ring groove of a piston.

A further object of the invention is to provide a piston ring consisting of two spirally wound members shaped so, that a plurality of oil grooves will be formed as well between the members forming the ring as between the outer surfaces of the ring and walls of the groove in the piston.

A still further object of the invention is to provide a piston ring consisting of a plurality of spirally wound members being arranged in juxtaposition and forming oil grooves between the members and the walls of the ring groove of the piston, each member being provided with a bend or a kink of a depth equal or approximately equal to the combined thickness of the members forming the ring.

Other objects of the invention not specifically mentioned in the above statement may be easily ascertained and understood from the following description in connection with the accompanying drawing forming a part of the specification.

Furthermore it is an object of the invention to form a piston ring by assembling two spirally wound members, each of which has approximately two convolutions and is provided with a kink or offset, the assembling of the two members being effected by screwing one of the members into the other so that the convolutions will be arranged in interpolated position with reference to each other, and that the two offsets will abut each other, whereby the two members are prevented from rotary crawling movement in relation to each other.

It is however to be understood that the invention is not to be limited or restricted to the exact formation and construction shown in the drawing and described in the specification, but that said invention is only to be limited by the scope of the claims appended hereto.

In the drawing illustrating a preferred embodiment of the invention

Fig. 1 shows a piston provided with a piston ring according to the present invention, said piston being only partly inserted into a cylinder, so that piston ring is still located outside of the cylinder.

Fig. 2 shows a piston provided with a piston ring according to the present invention, said piston being shown arranged inside of a cylinder so that the piston ring is compressed and in working position, and Fig. 3 is detail view, partly shown in section and taken on line 3—3 in Fig. 2.

The piston ring according to the present invention consists of two members 5 and 6 respectively. Each member is preferably made of flat spring material. Intermediate its ends each member is provided with a bend or kink 7 as clearly shown in Figs. 1 and 2. The offset caused by this bend or kink is approximately of the same dimension as the combined thickness of two members forming the piston ring in axial direction. Each of the members is dished out or formed conical so that the inner rim of each member is arranged in another plan than the outer rim. The members are wound substantially in a spiral form and have approximately two convolutions. They are assembled by screwing one of the members into the other so that they will be arranged as illustrated in the drawing. The members must be positioned so in relation to each other that the bends or kinks abut with each other and the outer rims 9 of the two cooperating members touch each other over their entire length. As clearly shown in Fig. 3 oil grooves 10 are formed between the walls of the piston groove and the outer surface of the members forming the piston ring and a third oil groove is formed around the piston ring formed in this manner as shown at 11 in Fig. 3.

When the ring according to the present invention is arranged on a piston and the piston is inserted in a cylinder as shown in Fig. 2, the ends of the members forming the piston ring will practically abut the bend or kink so that each member is substantially closed. The inner rims will be forced against the walls of the ring groove so that a very effective piston ring is obtained, especially since a continuous oil film will spread against the wall of the cylinder from the oil in the three oil grooves and since the outer rims of the members will be forced against the cylinder wall. The members cannot crawl in relation to each other on account of the kinks or offsets abutting each other.

Having described my invention and how the same is to be operated, I claim as new and desire to secure by Letters Patent:

1. A piston ring of the class described consisting of two superimposed split members, each member being provided with an axially extended offset and the members arranged with their offsets together.

2. A piston ring of the class described consisting of a plurality of conically shaped and spirally wound members placed so that the corresponding windings of the adjacent members are in juxtaposition relative to each other, and each of said members being provided with a bend of a depth substantially equal to the combined axial dimension of the members forming the piston ring.

3. A piston ring of the class described consisting of two conically shaped and spirally wound members placed in juxtaposition to each other so as to converge in radial cross section, with the outer rims of the pair of members abutting each other, each member of said pair having approximately two full windings and a bend of a depth substantially equal to the total axial dimension of the adjacent members.

4. A piston ring formed of two members, each member being made of flat spring material wound in spiral form and having approximately two spiral convolutions, an offset being formed on each member intermediate its ends, the two members being assembled so that the convolutions of the one member are interpolated between the convolutions of the other member and the two offsets abut each other.

5. In combination with a piston providing an annular piston ring groove, a piston ring consisting of two spirally wound members, each member being made of flat spring material and having approximately two convolutions, and arranged with the convolutions of the one member between the convolutions of the other one and the total thickness of the material of the members forming said ring being sufficiently less than the axial length of said groove so that said ring may expand and contract axially and diametrically when in operation on said piston.

6. A packing ring comprising a plurality of split rings each of which is of approximately uniform thickness throughout its circumference and is convex on one side and concave on the other, certain of said rings having their outer edges contacting whereby their walls diverge inwardly relative to one another, and a laterally extended portion on each ring having about the same thickness as the remainder of the ring and extending between the ends of the adjacent ring.

7. A packing device of the character described comprising a plurality of split rings of approximately uniform thickness arranged side by side and having their walls diverging from each other, and a laterally bent portion on each ring having about the same thickness as the remainder of the ring and extending between the ends of one of the adjacent rings.

8. A packing device of the character described comprising a plurality of split rings of approximately uniform thickness and each of which is convex on one side and concave on the other, said rings being mounted side by side in diverging relationship and having their ends spaced circumferentially, and a laterally bent portion in connection with each ring having about the same thickness as the remainder of the ring and extending between the ends of an adjacent ring.

9. A packing device of the character described comprising a plurality of split rings, each of which is concave on one side and convex on the other and all of which are of approximately uniform thickness throughout their respective widths and lengths, said rings being arranged side by side whereby their walls diverge from each other and each of said rings having a laterally bent portion on its concave side only extending between the ends of one of the adjacent rings and having approximately the same thickness as the remainder of the ring.

10. A piston ring of the kind described, comprising a pair of intertwined ring members, each of a strip of resilient metal bent edgewise into at least a single dished convolution and provided with a lateral offset intermediate the ends of the member, the offsets of the members limiting circumferential shifting of the members.

11. A piston ring comprising an annulus of at least substantially two convolutions, said ring being of substantially uniform thickness of material throughout, with a lateral offset intermediate its ends forming a shoulder to either side equal to substantially double the thickness of material, so that two of said piston rings may be intertwined with a pair of free ends arranged to either side of said offset and opposed to said shoulder.

12. A piston ring element comprising a strip of resilient material bent into at least a pair of convolutions and provided with a lateral offset intermediate its ends, said offset portion having substantially the same thickness as the remainder of said element and being substantially twice as deep as said thickness, whereby a pair of said elements may be intertwined with their outermost ends arranged substantially flush with the adjacent correspondingly outermost edges of said offsets.

13. A piston ring of the kind described, comprising two intertwined split members of ribbon-like material, each member consisting of approximately two convolutions with an axially extended offset between said convolutions.

14. A piston packing ring comprising a thin resilient metal strip bent edgewise into at least two convolutions of dished form with a kink intermediate the convolutions and of twice the depth of the thickness of said metal whereby a pair of said rings may be intertwined with the top and bottom convolutions respectively of said assembly each being flush.

RUDOLF A. HAGEN.